June 21, 1938.  J. STARK  2,121,614
CYLINDER GAUGE
Filed Feb. 4, 1936
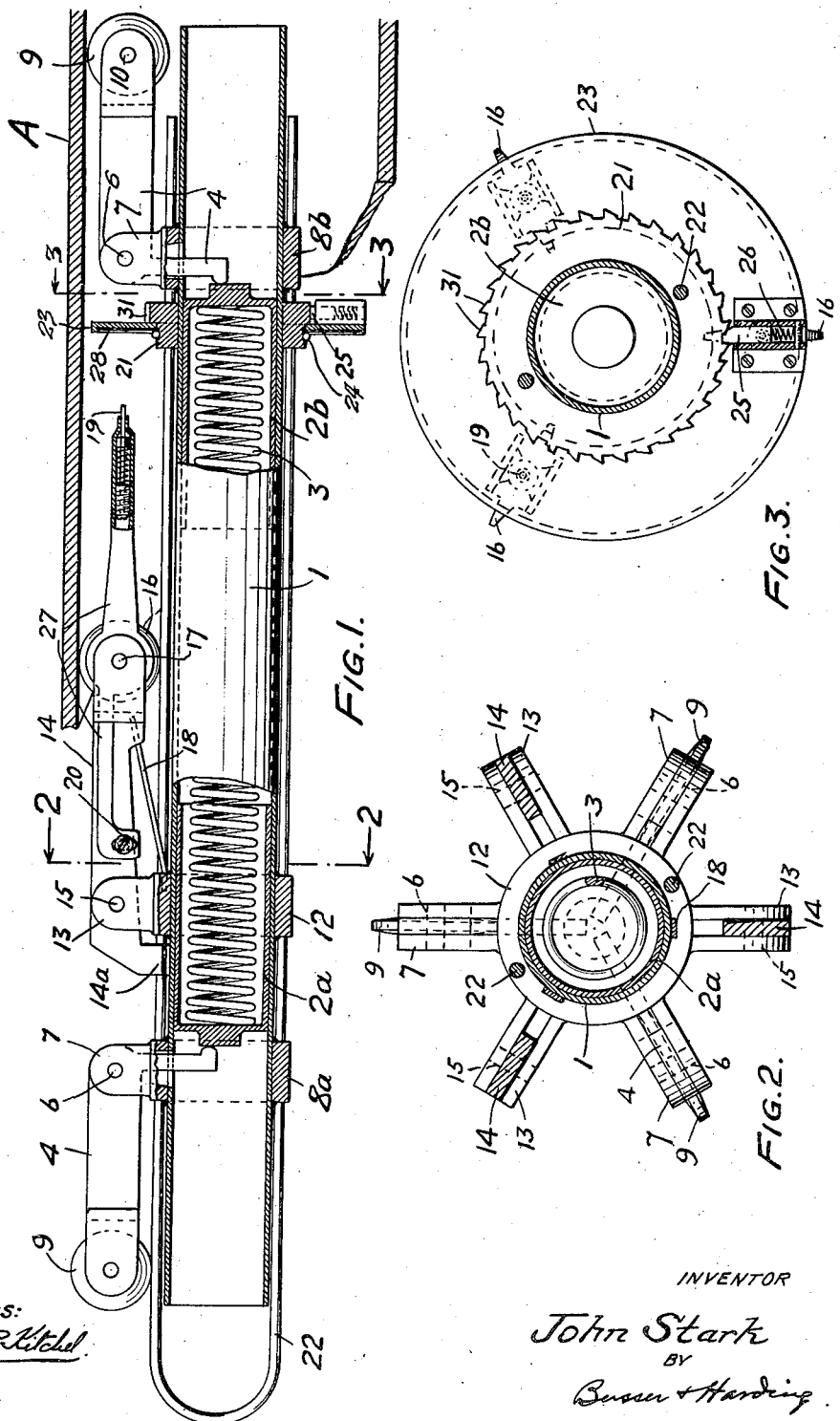
INVENTOR
John Stark
BY
Busser + Harding
ATTORNEYS.
WITNESS:

Patented June 21, 1938

2,121,614

UNITED STATES PATENT OFFICE 2,121,614

CYLINDER GAUGE

John Stark, Chester, Pa., assignor to Sun Oil Company, Philadelphia, Pa., a corporation of New Jersey Application February 4, 1936, Serial No. 62,256

3 Claims. (Cl. 33—178)

This invention relates to a recording gauge for gauging and recording the maximum and minimum internal diameters of cylinders or tubes.

The gauge embodied in this invention is especially adapted for gauging the maximum and minimum internal diameters of the tubes and pipes used in and around tubular oil stills and the like. After the coke has been cleaned from such stills, it is important that the tubes in the still and the transfer pipes be gauged for maximum and minimum internal diameters. Heretofore the gauges used for such gauging have generally been equipped with long handles by means of which the gauge could be pushed or pulled through the tube being gauged. With such gauges the reading or record was taken from some device at the end of the handle which was operated by rods or other connections from the gauge. With the long tubes now used in such stills the handle of the gauge must necessarily be very long, thus not only making the gauge unwieldy, but also seriously impairing its accuracy.

It is therefore an object of this invention to provide an internal cylinder or tube gauge which may be wholly inserted in the cylinder or tube to be gauged and with which a continuous record from end to end of the tube of maximum and minimum internal diameters may be made, directly on the gauge without the necessity of long connections from the gauge to the end of the tube, except for a cord used to draw the gauge through the tube.

Referring now to the drawing which forms a part of this specification, and in which like numbers refer to like parts throughout:

Fig. 1 is a longitudinal section of the preferred form of this invention,

Fig. 2 is a section taken on the line 2—2 of Fig. 1, and

Fig. 3 is a section taken on the line 3—3 of Fig. 1.

In the drawing, the body of the gauge consists of a tube 1, within which two sleeves 2a and 2b are slidably mounted. These sleeves 2a and 2b are pressed outwardly, by a spring 3, against the centralizing arms 4 which extend through openings in the tube 1. These centralizing arms are in the form of a bell crank, and are fastened by pins 6 to radially extending lugs 7 on collars 8a and 8b welded to tube 1. Preferably three such centralizing arms 4, spaced equidistantly about tube 1 are attached to each of the collars 8a and 8b. The outer arm of each of the centralizing arms 4 is forked and a wheel or sliding shoe 9 is fastened thereto by pin 10.

A recording arm holder in the form of a collar 12 is welded to tube 1 between the collars 8a and 8b, and recording arms 14 are fastened to radially extending lugs 13 on collar 12 by pins 15. There are preferably three recording arms 14 spaced equidistantly around tube 1. A wheel or sliding shoe 16 is fastened to each recording arm 14 by pin 17. A spring 18, fastened to tube 1 or collar 12, presses each recording arm 14 outwardly with its tail 14a normally resting against tube 1. A pencil lead or other suitable stylus 19 is held in the outer end of an arm 27 pivoted at 17 to each recording arm 14 and may be adjusted radially by means of set screw 20.

A collar 21 is slidably mounted on tube 1 between the outer end of recording arm 14 and collar 8b. Collar 21 is fixedly fastened to wire loop 22 which passes through guide holes in collars 8a and 8b and recording arm holder 12. A disk 23 is rotatably mounted on collar 21, being held thereon by a split ring 24. A series of equally spaced ratchet teeth 31 are machined on the collar 21. Ratchet pawl 25 on disk 23, pressed by spring 26, engages ratchet teeth 31 on collar 21 and prevents rotation of disk 23. A disk of paper 28 may be inserted in an inset in disk 23 and be held in place by said split ring.

The disk 23 is pushed back until it is not in contact with pencil point 19. Ratchet pawl 25 is then pulled back and the disk 23 is rotated until unmarked portions of paper 27 are opposite the recording arms 14, ratchet pawl 25 is then released locking disk 23 in place. A wire or other means for pulling the gauge through the tube is then passed through the tube A and fastened to the wire loop 22. The entire gauge is then inserted in the tube A, care being taken not to pull the wire loop 22 and thus pull disk 23 against the pencil point 19. When the gauge has been inserted in the tube A, the centralizing arms 4, being pushed outwardly by spring 3, will center the gauge or tube 1 in tube A, the wheels 9 on centralizing arms 4 bearing against the walls of the tube A. The recording arms 14 are pressed outwardly by springs 18 and wheels 16 on arms 14 bear against the walls of tube A. The gauge is then pulled through the tube being gauged by the wire attached to wire loop 22. Pulling wire loop 22 draws the collar 21 along the tube 1 until disk 23 is in contact with pencil points 19. As the gauge is drawn through the tube A, the wheels 16 on recording arms 14 follow the contour of the walls of the tube, so that any variations in the internal diameter of the tube is recorded on the paper disk 28 by the pencil points 19. Before the gauge is withdrawn from the tube, the wire loop 22 should be pushed back, thus moving disk 23 away from pencil point 19. The gauge is then withdrawn from the tube A and the maximum and minimum internal diameter of the tube A may then be read on paper disk 23. Ratchet pawl 25 may then be drawn back and the disk 23 rotated one notch, thus bringing a clean part of paper disk 28 opposite the pencil point 19. The gauge may then be used to gauge another tube in the manner described above.

While I have herein shown and described a preferred embodiment of my invention, it is apparent that various changes and modifications may be made therein without departing from the spirit of my invention or the scope of the appended claims.

Having now described my invention, what I claim and desire to protect by Letters Patent is:

1. A gauge for measuring the maximum and minimum internal diameters of cylinders which comprises an elongated gauge body adapted to be wholly inserted within the cylinder to be gauged and movable longitudinally therein, centering arms pivoted on said gauge body near each end thereof, and having their outer ends free to move in a radial direction therefrom, means for applying uniform outward pressure to said centering arms, recording arms pivoted on said gauge body and having their outer ends free to move in a radial direction therefrom, means for applying outward pressure to said recording arms, a recording surface carried by said gauge body and movable longitudinally therealong, means for drawing said gauge body through the cylinder to be gauged, said last named means being operable to first move said recording surface longitudinally along said gauge body into contact with said recording arms and then to move the gauge longitudinally through the cylinder whereby, during said movement of the gauge, said recording surface records radial movements of said recording arms.

2. A gauge for measuring the maximum and minimum internal diameters of cylinders, which comprises a gauge body, gauge-centering means carried by the gauge body comprising two series of wheels movable longitudinally along the inner wall of the cylinder being gauged, a recording device, positioned between said centering means, which is movable longitudinally with the gauge body and which comprises cooperating devices one of which is adapted in such longitudinal movement to follow the contour of the cylinder wall and the other of which has a limited longitudinal movement relative to the gauge body to enable it to be brought into operating relation with the first named device.

3. A gauge for measuring the maximum and minimum internal diameters of cylinders which comprises a gauge body, centering means carried thereby and adapted to engage the internal wall of the cylinder and to be rolled longitudinally therealong, a recording device, carried by the gauge body, comprising cooperating devices, movable longitudinally with the gauge body, one of which comprises a radially movable element adapted in its longitudinal movement to follow the contour of the cylinder wall and a marker movable radially with said element and the other of which is an annular disc having a recording surface and being longitudinally movable relative to the gauge body into operative relation with the marker, and manually operative means which is operable to first impart to said disc the relative longitudinal movement specified and to then longitudinally move the gauge and both of said cooperating devices in unison.

JOHN STARK.